US010635220B2

(12) United States Patent
Kobayashi et al.

(10) Patent No.: US 10,635,220 B2
(45) Date of Patent: Apr. 28, 2020

(54) SIGNAL PROCESSING CIRCUIT FOR ELECTROSTATIC CAPACITY TYPE TOUCH SENSOR

(75) Inventors: Kazuyuki Kobayashi, Midori (JP); Tatsuya Suzuki, Kumagaya (JP); Kumiko Fukai, Ora-gun (JP); Yasuhiro Kaneta, Isesaki (JP)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

(21) Appl. No.: 12/796,850

(22) Filed: Jun. 9, 2010

(65) Prior Publication Data

US 2010/0315363 A1  Dec. 16, 2010

(30) Foreign Application Priority Data

Jun. 10, 2009  (JP) .................................. 2009-139229

(51) Int. Cl.
    *G06F 3/041*  (2006.01)
    *G06F 3/044*  (2006.01)

(52) U.S. Cl.
    CPC ............ *G06F 3/0416* (2013.01); *G06F 3/044* (2013.01); *G06F 3/0443* (2019.05); *G06F 3/0418* (2013.01)

(58) Field of Classification Search
    CPC ......... G06F 3/044–0448; G06F 3/0416–04186
    USPC .............................. 345/174; 178/18.06, 19.03
    See application file for complete search history.

(56) References Cited

U.S. PATENT DOCUMENTS

| 4,567,470 | A |   | 1/1986  | Yoshikawa et al. |
|-----------|---|---|---------|------------------|
| 4,700,022 | A | * | 10/1987 | Salvador et al. ............ 178/20.03 |
| 4,873,400 | A |   | 10/1989 | Rapp et al. |
| 5,305,017 | A | * | 4/1994  | Gerpheide ...................... 345/174 |
| 7,391,411 | B2| * | 6/2008  | Morimoto et al. ............ 345/161 |
| 2004/0155871 | A1 | * | 8/2004 | Perski et al. ................... 345/174 |
| 2007/0074913 | A1 | * | 4/2007 | Geaghan et al. ........... 178/18.06 |
| 2007/0268272 | A1 | * | 11/2007 | Perski et al. ................... 345/173 |
| 2009/0025987 | A1 | * | 1/2009 | Perski et al. ................ 178/18.03 |

(Continued)

FOREIGN PATENT DOCUMENTS

| JP | 58-191034 | 11/1983 |
|----|-----------|---------|
| JP | 01-120616 | 5/1989  |

(Continued)

OTHER PUBLICATIONS

Japanese Office Action issued in Application No. 2009-139229 dated Aug. 27, 2013.

*Primary Examiner* — Patrick F Marinelli
(74) *Attorney, Agent, or Firm* — Robert F. Hightower

(57) ABSTRACT

There is offered a signal processing circuit for an electrostatic capacity type touch sensor which can improve the noise tolerance and adjust an offset in the output voltage. The signal processing circuit for the touch sensor is structured to include an alternating current power supply providing an excitation pad with an alternating voltage, an electric charge amplifier generating an output voltage Vout corresponding to a difference between a capacitance of a first capacitor formed between a first touch pad and the excitation pad and a capacitance of a second capacitor formed between a second touch pad and the excitation pad, and an offset adjustment circuit to adjust an offset in the output voltage Vout of the electric charge amplifier.

15 Claims, 9 Drawing Sheets

(56) References Cited

U.S. PATENT DOCUMENTS

| | | | | |
|---|---|---|---|---|
| 2009/0256578 A1* | 10/2009 | Wuerstlein | ........... | G01D 5/2405 324/601 |
| 2010/0171723 A1* | 7/2010 | Kobayashi | ............ | G06F 3/0416 345/174 |
| 2010/0307840 A1* | 12/2010 | Kobayashi | .............. | G06F 3/044 178/18.06 |
| 2010/0309165 A1* | 12/2010 | Kobayashi | ............ | G06F 3/0416 345/174 |
| 2010/0315363 A1* | 12/2010 | Kobayashi | ............ | G06F 3/0416 345/173 |
| 2011/0012863 A1* | 1/2011 | Kobayashi | .......... | G06F 3/03547 345/174 |
| 2011/0122089 A1* | 5/2011 | Kobayashi | ............ | G06F 3/0418 345/174 |
| 2013/0269177 A1* | 10/2013 | Kobayashi | ............ | G06F 3/0418 29/622 |

FOREIGN PATENT DOCUMENTS

| | | | | |
|---|---|---|---|---|
| JP | 2005-190950 | | 7/2005 | |
| WO | WO-2008046514 A2 * | | 4/2008 | ........... G01D 5/2405 |

* cited by examiner

FIG. 1A  CA1 > CA2
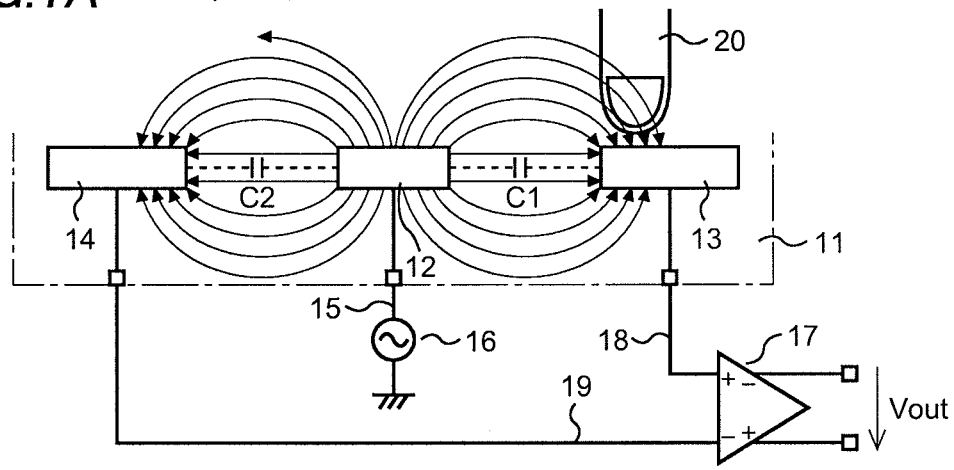
FIG. 1B  CA1 = CA2
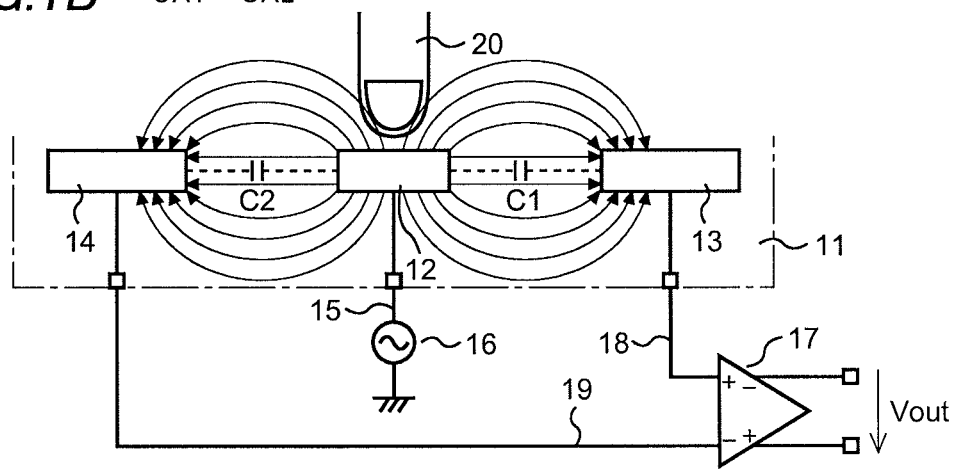
FIG. 1C  CA1 < CA2
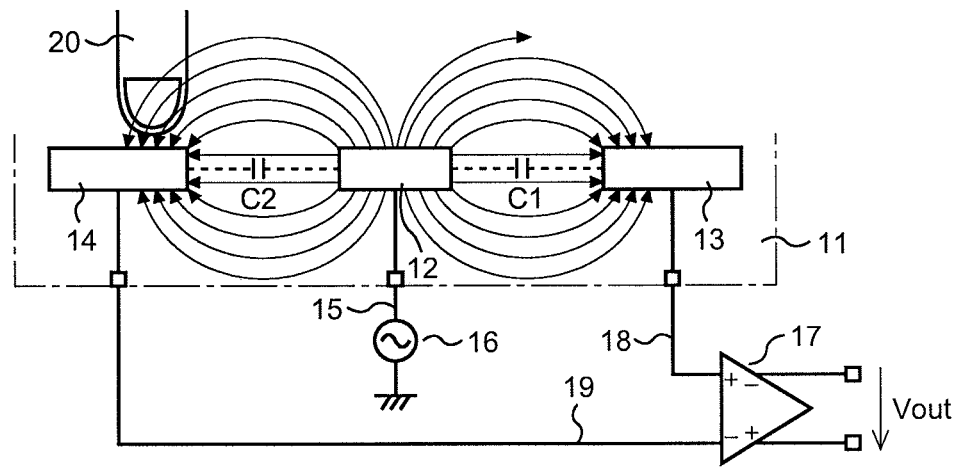

CHARGE ACCUMULATION MODE

CHARGE TRANSFER MODE

SIGNAL PROCESSING CIRCUIT FOR ELECTROSTATIC CAPACITY TYPE TOUCH SENSOR

CROSS-REFERENCE OF THE INVENTION

This application claims priority from Japanese Patent Application No. 2009-139229, the content of which is incorporated herein by reference in its entirety.

BACKGROUND OF THE INVENTION

Field of the Invention

This invention relates to a signal processing circuit for an electrostatic capacity type touch sensor.

Description of the Related Art

The electrostatic capacity type touch sensor has been known as an input device to various kinds of electronic devices such as a mobile phone, a portable audio device, a portable game console, a television and a personal computer.

A conventional electrostatic capacity type touch sensor is explained referring to FIG. 10 and FIG. 11. A touch pad 61 is formed on a PCB (Printed Circuit Board) substrate 60 so that an electrostatic capacitor 62 (capacitance C) is formed between the touch pad 61 and the PCB substrate 60, as shown in FIG. 10. The touch pad 61 is connected to a non-inverting input terminal (+) of a comparator 63 through a wiring 64. A reference voltage Vref is applied to an inverting input terminal (−) of the comparator 63. A constant current power supply 65 is connected to the wiring 64 that connects the touch pad 61 and the non-inverting input terminal (+) of the comparator 63.

Operations of the electrostatic capacity type touch sensor are explained referring to FIG. 11. When a finger 66 of an operator is far away from the touch pad 61, a capacitance associated with the touch pad 61 is C. In this case, a voltage at the touch pad 61 increases from 0 V in a reset state as the electrostatic capacitor 62 is charged with a constant current from the constant current power supply 65. An output voltage of the comparator 63 is inverted when the voltage at the touch pad 61 reaches the reference voltage Vref. A length of time from the reset state to the inversion of the comparator 63 in this case is referred to as t1.

When the finger 66 of the operator approaches the touch pad 61, on the other hand, the capacitance associated with the touch pad 61 increases to C+C'. The increment C' is a capacitance of a capacitor formed between the finger 66 of the operator and the touch pad 61. As a result, the length of time that the voltage at the touch pad 61 takes from 0 V to the reference voltage Vref increases to t2 (t2>t1). That is, it is possible to detect whether the finger 66 of the operator has touched the touch pad 61 or not, based on a difference (t2−41) in the length of time taken by the transition from the reset state to the inversion of the comparator 63. In other words, the touch pad 61 functions as an ON/OFF switch for data input.

Technologies mentioned above are disclosed in Japanese Patent Application Publication No. 2005-190950, for example.

In the conventional touch sensor, however, there is a problem that the voltage at the touch pad 61 is varied to cause malfunctioning when a noise is applied to the touch pad 61.

SUMMARY OF THE INVENTION

The invention provides a signal processing circuit for an electrostatic capacity type touch sensor that receives a signal from a first and second touch pads disposed on a touch panel using an excitation pad disposed between the first and second touch pads for signal processing. The signal processing circuit includes a first alternating current power supply generating a first alternating voltage, and an electric charge amplifier generating an output voltage corresponding to a difference between a first capacitance of a first capacitor and a second capacitance of a second capacitor when the first alternating voltage is applied to the excitation pad. The first capacitor is formed between the first touch pad and the excitation pad, and the second capacitor is formed between the second touch pad and the excitation pad. The signal processing circuit also includes an offset adjustment circuit adjusting an offset in the output voltage of the electric charge amplifier.

The invention provides a signal processing device that includes a touch panel and a signal processing circuit for the touch panel. The touch panel includes a plurality of pairs of touch pads, each of the touch pads is a first kind of touch pad, a second kind of touch pad, a third kind of touch pad or a fourth kind of touch pad, and each of the pairs of touch pads includes two touch pads of a single kind or two touch pads of two different kinds. The touch panel also includes an excitation pad disposed between neighboring two of the pairs of touch pads. The signal processing circuit includes a first alternating current power supply providing the excitation pad with a first alternating voltage, an electric charge amplifier generating a first output voltage corresponding to a difference between a capacitance of a first capacitor formed between the excitation pad and the first kind of touch pad and a capacitance of a second capacitor formed between the excitation pad and the second kind of touch pad and generating a second output voltage corresponding to a difference between a capacitance of a third capacitor formed between the excitation pad and the third kind of touch pad and a capacitance of a fourth capacitor formed between the excitation pad and the fourth kind of touch pad, and an offset adjustment circuit adjusting an offset in the first output voltage or an offset in the second output voltage.

BRIEF DESCRIPTION OF THE DRAWINGS

FIGS. 1A, 1B and 1C show an electrostatic capacity type touch sensor and a signal processing circuit according to a first embodiment of this invention.

DETAILED DESCRIPTION OF THE INVENTION

Figure 2:
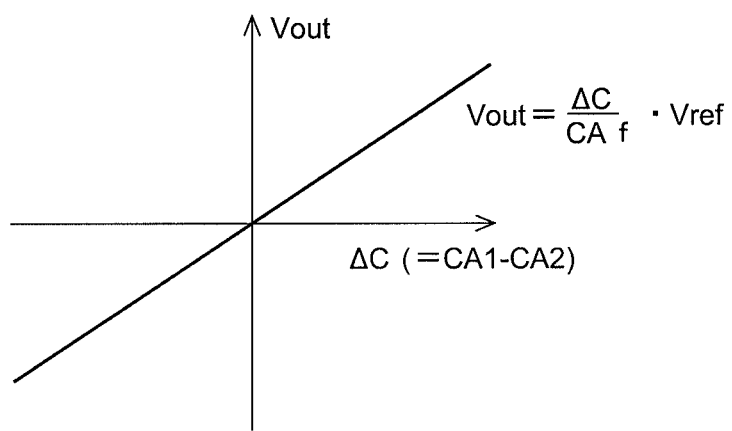
FIG. 2 shows input/output characteristics of an electric charge amplifier.

A signal processing circuit for an electrostatic capacity type touch sensor according to a first embodiment of this invention is hereafter described referring to the drawings.

The touch sensor is structured so that an excitation pad 12, a first touch pad 13 and a second touch pad 14 are disposed on a substrate 11 such as a PCB substrate in a way that the excitation pad 12 is interposed between the first and second touch pads 13 and 14, as shown in FIGS. 1A, 1B and 1C. A dielectric layer (not shown) is formed between the excitation pad 12 and each of the first and second touch pads 13 and 14.

That is, a first electrostatic capacitor C1 is formed of the excitation pad 12 and the first touch pad 13. Similarly, a second electrostatic capacitor C2 is formed of the excitation pad 12 and the second touch pad 14. The first electrostatic capacitor C1 has a capacitance CA1, while the second electrostatic capacitor C2 has a capacitance CA2. It is preferable that the capacitances CA1 and CA2 are set to be equal to each other in an initial state. Since the excitation pad 12 and the first and second touch pads 13 and 14 are electrodes, it is preferable that surfaces of these electrodes are covered with an insulator such as plastic, wood or rubber.

On the other hand, an alternating current power supply 16 that provides the excitation pad 12 with an alternating voltage through a wiring 15 is provided on a side of the signal processing circuit (IC). Amplitude of the alternating voltage is referred to as an excitation voltage Vref. Also, there is provided an electric charge amplifier 17. The first touch pad 13 is connected to a non-inverting input terminal (+) of the electric charge amplifier 17 through an wiring 18, while the second touch pad 14 is connected to an inverting input terminal (−) of the electric charge amplifier 17 through a wiring 19.

The electric charge amplifier 17 generates a voltage corresponding to a difference between the capacitance CA1 of the first capacitor C1 formed between the excitation pad 12 and the first touch pad 13 and the capacitance CA2 of the second capacitor C2 formed between the excitation pad 12 and the second touch pad 14.

Figure 3:
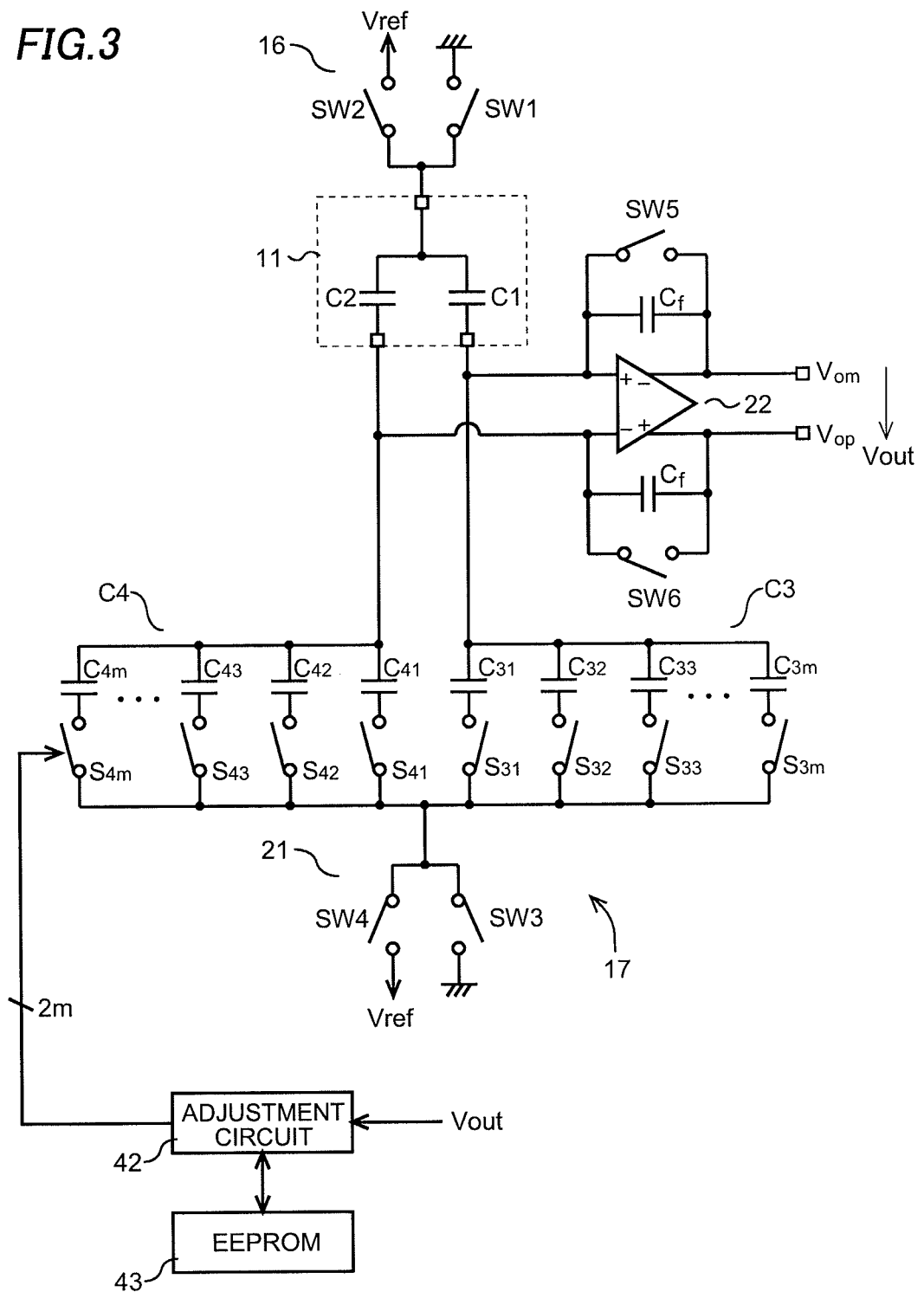
FIG. 3 is a circuit diagram of the electric charge amplifier.
Figure 4A:
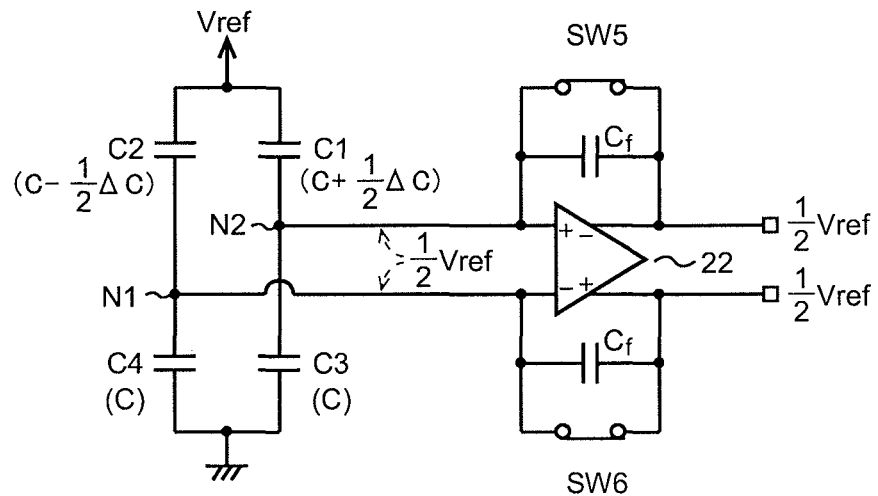
FIGS. 4A and 4B show operations of the electric charge amplifier.
Figure 4B:
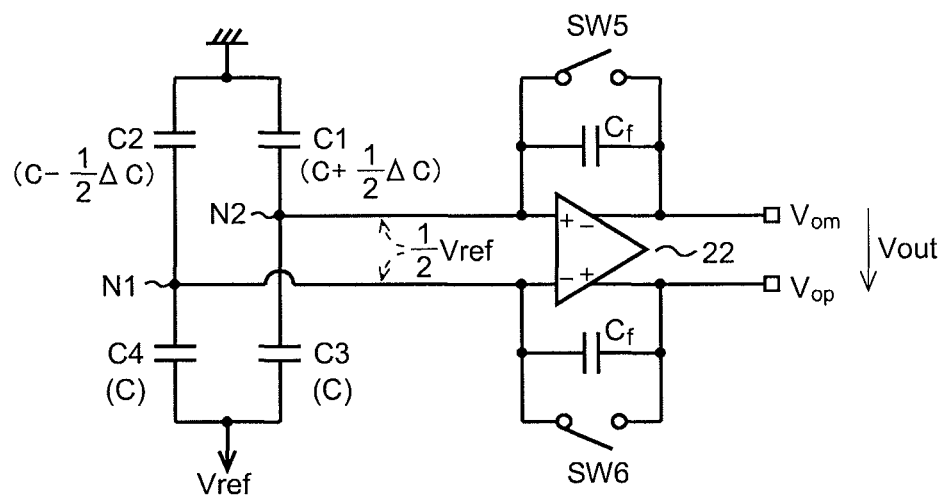

An example of a concrete structure of the electric charge amplifier 17 is described hereafter referring to FIG. 3, FIG. 4A and FIG. 4B. The first capacitor C1 and the second capacitor C2 are formed on the substrate 11 that is depicted as a portion encircled by a dashed line in FIG. 3. Portions of the structure shown in FIG. 3 except for the substrate 11 make the signal processing circuit.

The alternating current power supply 16 is formed of switches SW1 and SW2 that are switched alternately. The alternating current power supply 16 outputs a ground voltage (0 V) when the switch SW1 is closed and the switch SW2 is opened, and outputs the excitation voltage Vref (positive voltage) when the switch SW1 is opened and the switch SW2 is closed. In this case, the alternating current power supply 16 outputs a clock signal voltage alternating between the excitation voltage Vref (H level) and 0 V (L level).

A third electrostatic capacitor C3 is connected in series with the first electrostatic capacitor C1, while a fourth electrostatic capacitor C4 is connected in series with the second electrostatic capacitor C2. The third electrostatic capacitor C3 has a capacitance CA3, while the fourth electrostatic capacitor C4 has a capacitance CA4.

An alternating current power supply 21, that is similar to the alternating current power supply 16, is connected to a connecting node between the third and fourth electrostatic capacitors C3 and C4. The alternating current power supply 21 is formed of switches SW3 and SW4 that are switched alternately. The alternating current power supply 21 outputs the ground voltage (0 V) when the switch SW3 is closed and the switch SW4 is opened, and outputs the excitation voltage Vref (positive voltage) when the switch SW3 is opened and the switch SW4 is closed. The alternating current power supply 16 and the alternating current power supply 21 output the clock signal voltages that are opposite in phase to each other.

A wiring drawn out from a connecting node N2 between the first and third electrostatic capacitors C1 and C3 is connected to a non-inverting input terminal (+) of an ordinary differential amplifier 22, while a wiring drawn out from a connecting node N1 between the second and fourth electrostatic capacitors C2 and C4 is connected to an inverting input terminal (−) of the differential amplifier 22.

A feedback capacitor Cf is connected between an inverting output terminal (−) and the non-inverting input terminal (+) of the differential amplifier 22, while an identical feedback capacitor Cf is connected between a non-inverting output terminal (+) and the inverting input terminal (−) of the differential amplifier 22. Each of the feedback capacitors Cf has a capacitance CAf.

A switch SW5 is connected between the inverting output terminal (−) and the non-inverting input terminal (+) of the differential amplifier 22, while a switch SW6 is connected between the non-inverting output terminal (+) and the inverting input terminal (−) of the differential amplifier 22. The switches SW5 and SW6 are switched simultaneously. That is, when the switches SW5 and SW6 are closed, the inverting output terminal (−) and the non-inverting input terminal (+) of the differential amplifier 22 are short-circuited while the non-inverting output terminal (+) and the inverting input terminal (−) of the differential amplifier 22 are short-circuited.

A voltage difference between an output voltage Vom from the inverting output terminal (−) of the differential amplifier 22 and an output voltage Vop from the non-inverting output terminal (+) of the differential amplifier 22 is represented by an output voltage Vout (=Vop−Vom).

In the structure described above, the third and fourth electrostatic capacitors C3 and C4 are formed of variable capacitance capacitors in order to compensate an offset in the output voltage Vout due to an imbalance between the first and second electrostatic capacitors C1 and C2. That is, the third electrostatic capacitor C3 is formed to include m electrostatic capacitors $C_{31}$-$C_{3m}$, each having each of capacitances $CA_{31}$-$CA_{3m}$, respectively, and m switches $S_{31}$-$S_{3m}$. It is preferable that the capacitances $CA_{31}$-$CA_{3m}$, are weighted so that the capacitance of the third electrostatic capacitor C3 is minutely modified. For example, when the capacitance $CA_{31}$ of the capacitor $C_{31}$ is denoted as $C_0$, $CA_{32}=\frac{1}{2}C_0$, $CA_{33}=\frac{1}{4}C_0$, $CA_{34}=\frac{1}{8}C_0$, $CA_{3m}=\frac{1}{2}^{m-1}C_0$. Each of the switches $S_{31}$-$S_{3m}$ is connected between corresponding each of the electrostatic capacitors $C_{31}$-$C_{3m}$ and the alternating current power supply 21. Each of the switches $S_{31}$-$S_{3m}$ is turned on and off by corresponding each of m-bits of adjustment signals from an offset adjustment circuit 42. That is, when a switch $S_{3x}$, that is one of the switches $S_{31}$-$S_{3m}$, is turned on, an electrostatic capacitor $C_{3x}$, that is corresponding one of the capacitors $C_{31}$-$C_{3m}$, is electrically connected between the first electrostatic capacitor C1 and the alternating power supply 21.

Also, the fourth electrostatic capacitor C4 is formed to include m electrostatic capacitors $C_{41}$-$C_{4m}$, each having each of capacitances $CA_{41}$-$CA_{4m}$, respectively, and m switches $S_{41}$-$S_{4m}$. It is preferable that the capacitances $CA_{41}$-$CA_{4m}$ are weighted for the same reason. For example, when the capacitance $CA_{41}$ of the capacitor $C_{41}$ is denoted as $C_0$, $CA_{42}=\frac{1}{2} C_0$, $CA_{43}=\frac{1}{4} C_0$, $CA_{44}=\frac{1}{8} C_0$, $CA_{4m}=\frac{1}{2}^{m-1} C_0$. Each of the switches $S_{41}$-$S_{4m}$ is connected between corresponding each of the electrostatic capacitors $C_{41}$-$C_{4m}$ and the alternating current power supply 21. Each of the switches $S_{41}$-$S_{4m}$ is turned on and off by corresponding each of m-bits of adjustment signals from the offset adjustment circuit 42. That is, when a switch $S_{4x}$, that is one of the switches $S_{41}$-$S_{4m}$, is turned on, an electrostatic capacitor $C_{4x}$, that is corresponding one of the capacitors $C_{41}$-$C_{4m}$, is electrically connected between the second electrostatic capacitor C2 and the alternating power supply 21.

With the structure described above, the capacitances CA3 and CA4 of the third and fourth capacitors C3 and C4 can be adjusted by the corresponding m-bits of adjustment signals from the offset adjustment circuit 42. The offset adjustment circuit 42 can determine the 2m-bits of adjustment signals with which the offset in the output voltage Vout becomes a desired value, that is preferably the minimum value, based on the output voltage Vout. The determined adjustment signals are written into an electrically writable/erasable non-volatile memory such as an EEPROM 43 by a control circuit and stored.

Next, operations of the circuit structured as described above will be explained referring to FIGS. 4A and 4B. Each of the third and fourth electrostatic capacitors C3 and C4 is represented as a symbol of single capacitor in FIGS. 4A and 4B, for the sake of simplicity. The circuit has a charge accumulation mode and a charge transfer mode that alternate a multitude of times.

In the charge accumulation mode that is shown in FIG. 4A, the excitation voltage Vref is applied to the first and second electrostatic capacitors C1 and C2 by opening SW1 and closing SW2 of the alternating current power supply 16. Also the ground voltage (0 V) is applied to the third and fourth electrostatic capacitors C3 and C4 by opening SW4 and closing SW3 of the alternating current power supply 21.

Also, SW5 and SW6 are closed. With this, the inverting output terminal (−) and the non-inverting input terminal (+) of the differential amplifier 22 are short-circuited while the non-inverting output terminal (+) and the inverting input terminal (−) are short-circuited. As a result, a voltage at the node N1 (node of the wiring connected to the inverting input terminal (−)), a voltage at the node N2 (node of the wiring connected to the non-inverting input terminal (+)), a voltage at the inverting output terminal (−) and a voltage at the non-inverting output terminal (+) all become ½ Vref. Here, a common mode voltage of the differential amplifier 22 is ½ Vref, which is a half of the excitation voltage Vref.

Next, in the charge transfer mode that is shown in FIG. 4B, the ground voltage (0 V) is applied to the first and second electrostatic capacitors C1 and C2 by closing SW1 and opening SW2 of the alternating current power supply 16. Also, the excitation voltage Vref is applied to the third and fourth electrostatic capacitors C3 and C4 by closing SW4 and opening SW3 of the alternating current power supply 21. Also, SW5 and SW6 are opened.

After that, the circuit returns to the charge accumulation mode shown in FIG. 4A, and then turns to the charge transfer mode again. The electric charge amplifier 17 reaches a stable state after repeating the operations described above a multitude of times.

In the charge accumulation mode,

Amount of Electric Charges at $N1 =$ [Equation 1]
$$CA2 \cdot \left(-\frac{Vref}{2}\right) + CA4 \cdot \left(\frac{Vref}{2}\right)$$

where $CA2\cdot(-\frac{1}{2} Vref)$ represents an amount of electric charges stored in C2, and $CA4\cdot(\frac{1}{2} Vref)$ represents an amount of electric charges stored in C4.

In the charge transfer mode,

Amount of Electric Charges at $N1 =$ [Equation 2]
$$CA2 \cdot \left(\frac{Vref}{2}\right) + CA4 \cdot \left(-\frac{Vref}{2}\right) + CAf \cdot \left(Vop - \frac{Vref}{2}\right)$$

where $CA2\cdot(\frac{1}{2} Vref)$ represents an amount of electric charges stored in C2, $CA4\cdot(-\frac{1}{2} Vref)$ represents an amount of electric charges stored in C4, and $CAf\cdot(Vop-\frac{1}{2} Vref)$ represents an amount of electric charges stored in Cf. [Equation 1]=[Equation 2] holds, since the amount of electric charges at the node N1 in the charge accumulation mode is equal to the amount of electric charges at the node N1 in the charge transfer mode according to the law of conservation of electric charge.

Following equation is obtained by solving [Equation 1]=[Equation 2] for Vop.

$$Vop = \left(1 - \frac{CA2}{CAf} + \frac{CA4}{CAf}\right) \cdot \left(\frac{Vref}{2}\right)$$ [Equation 3]

Similarly, following equation is obtained by applying the law of conservation of electric charge to the electric charges at the node N2 and solving the resulting equation for Vom.

$$Vom = \left(1 - \frac{CA1}{CAf} + \frac{CA3}{CAf}\right) \cdot \left(\frac{Vref}{2}\right)$$ [Equation 4]

Vout is obtained from [Equation 3] and [Equation 4].

$$Vout = \frac{CA1 - CA2 - (CA3 - CA4)}{CAf} \cdot Vref$$ [Equation 5]

The capacitances CA1 and CA2 of the electrostatic capacitors C1 and C2, each formed between the excitation pad 12 and each of the first and second touch pads 13 and 14, respectively, are set to be equal to each other, and are set to be CA1=CA2=CA3=CA4=C in the initial state in which the finger 20 of the operator is far away from the touch pads 13 and 14. When the finger of the operator approaches to the touch pad, a capacitance difference ΔC is caused between CA1 and CA2. That is, CA1−CA2=ΔC.

In this case, the output voltage Vout is represented by the following equation as derived from the equation 5.

$$Vout = \frac{\Delta C}{CAf} \cdot Vref \quad \text{[Equation 6]}$$

That is, it is understood that the output voltage Vout of the electric charge amplifier 17 varies proportionally to the capacitance difference ΔC between the capacitances CA1 and CA2, as shown in FIG. 2.

In reality, however, it is difficult to set the capacitances CA1 and CA2 of the electrostatic capacitors C1 and C2, each formed between the excitation pad 12 and each of the first and second touch pads 13 and 14, respectively, perfectly equal to each other because of an influence of parasitic capacitances of wirings or the like connected to the touch pads 13 and 14. As a result, there exists a capacitance difference ΔC' between CA1 and CA2 even in the initial state. In this case, CA1−CA2=ΔC'. Assuming CA3=CA4=C, the output voltage Vout is represented by the following equation as derived from the equation 5.

$$Vout = \frac{\Delta C'}{CAf} \cdot Vref \quad \text{[Equation 7]}$$

That is, although the output voltage Vout is supposed to be 0 V, there is caused an offset voltage as represented by the equation 6. When the offset voltage is caused, accuracy in detection of the touch position is reduced.

With the signal processing circuit according to the embodiment of this invention, the offset voltage can be compensated by adjusting the capacitances CA3 and CA4 of the third and fourth capacitors C3 and C4 as described above. That is, the offset voltage can be made 0 V by adjusting the capacitances so as to be CA3−CA4=ΔC' in this case.

For example, when CA1=C+½ ΔC and CA2=C−½ ΔC in the initial state, the offset voltage can be made 0 V by adjusting the capacitances so as to be CA3=C+½ ΔC and CA4=C−½ ΔC. That is, when CA1 is larger than CA2, it is good enough that CA3 is adjusted to be larger than CA4 by the difference between CA1 and CA2.

The equation 6 holds in this case also, and when the finger 20 of the operator approaches the touch pad 13 or 14 to cause the capacitance difference ΔC between CA1 and CA2, the output voltage Vout of the electric charge amplifier 17 varies in proportion to the capacitance difference ΔC between the capacitances CA1 and CA2.

Principles of the operations of the touch sensor are hereafter explained referring to FIGS. 1A, 1B and 1C. In the following explanation, the offset voltage is adjusted to 0 V as described above. The explanation is given based on a dielectric model in which the finger 20 of the operator is regarded as a dielectric that is electrically floating.

First, when the finger 20 of the operator approaches the first touch pad 13 as shown in FIG. 1A, an electric field between the first touch pad 13 and the excitation pad 12 is varied so that the capacitance CA1 of the capacitor C1 formed between the first touch pad 13 and the excitation pad 12 becomes larger compared with the capacitance CA2 (CA1>CA2). This is because the number of lines of electric force originating from the excitation pad 12 and terminating at the first touch pad 13 is increased by that the finger 20 of the operator approaches the first touch pad 13. In this case, the output voltage Vout of the electric charge amplifier 17 becomes positive (+) as derived from the equation 5. The same result is obtained when a dielectric material such as an eraser approaches the first touch pad 13 instead of the finger 20 of the operator.

When the finger 20 of the operator is placed right above the excitation pad 12 as shown in FIG. 1B, the capacitance CA1 and the capacitance CA2 are equal to each other (CA1=CA2). In this case, the output voltage Vout of the electric charge amplifier 17 becomes 0 V.

When the finger 20 of the operator approaches the second touch pad 14 as shown in FIG. 1C, an electric field between the second touch pad 14 and the excitation pad 12 is varied so that the capacitance CA2 of the capacitor C2 formed between the second touch pad 14 and the excitation pad 12 becomes larger compared with the capacitance CA1 (CA2>CA1). In this case, the output voltage Vout of the electric charge amplifier 17 becomes negative (−) as derived from the equation 5.

The touch sensor described above can be used as an ON/OFF switch, since the output voltage Vout of the electric charge amplifier 17 is turned to the positive (+) voltage when the finger 20 of the operator approaches the first touch pad 13. Besides, the output voltage Vout of the electric charge amplifier 17 varies linearly with ΔC. That is, the closer the finger 20 of the operator approaches to the first touch pad 13, the larger becomes the positive output voltage Vout. Conversely, the closer the finger 20 of the operator approaches to the second touch pad 14, the larger becomes an absolute value of the negative output voltage Vout. Therefore, linear detection (analog detection) of the touch position of the finger 20 of the operator is made possible by utilizing the characteristics described above.

In addition, noise immunity can be improved with the touch sensor described above, since differential capacitance detection is adopted. That is, when a noise is applied to the first and second touch pads 13 and 14, an influence of the noise on the first touch pad 13 and an influence of the noise on the second touch pad 14 are cancelled out by each other so that the influence of the noise is suppressed from appearing in the output voltage Vout of the electric charge amplifier 17. Furthermore, since there is no influence of parasitic capacitances of the first and second touch pads 13 and 14 and the wirings 15, 18 and 19, no restriction is imposed on patterning of the touch pads and the like, enabling arbitrary patterning. Above explanation is based on the dielectric model in which the finger 20 of the operator is regarded as a dielectric material. When the finger 20 of the operator is grounded, on the other hand, an electric field shielding model applies. In this case, the finger 20 of the operator serves to shield the electric field so that the relative magnitude of the capacitance CA1 to the capacitance CA2 is reversed. That is, in the electric field shielding model, when the finger 20 of the operator approaches the first touch pad 13, the number of the lines of electric force originating from the excitation pad 12 and terminating at the first touch pad 13 is decreased because a part of the lines of electric force originating from the excitation pad 12 terminates at the finger 20 of the operator. As a result, the capacitance CA1 becomes smaller compared with the capacitance CA2 (CA1<CA2). Which of the dielectric model and the electric field shielding model applies is determined depending on the electrical state of the finger 20 of the operator or its alternative (a pen, an eraser or the like). However, there is no difference in that the touch position can be detected based on the changes in the capacitances, since only difference in the case where the electric field shielding model applies is that the relative magnitude of capacitance CA2 to the capacitance CA1 is reversed. The signal processing circuits according to the embodiments of this invention described below are explained based on the dielectric model.

Next, a signal processing circuit according to a second embodiment of this invention is explained. The signal processing circuit according to the second embodiment is a touch sensor that enables detecting eight or more than eight touch positions on a touch panel with four inputs.

Figure 5:
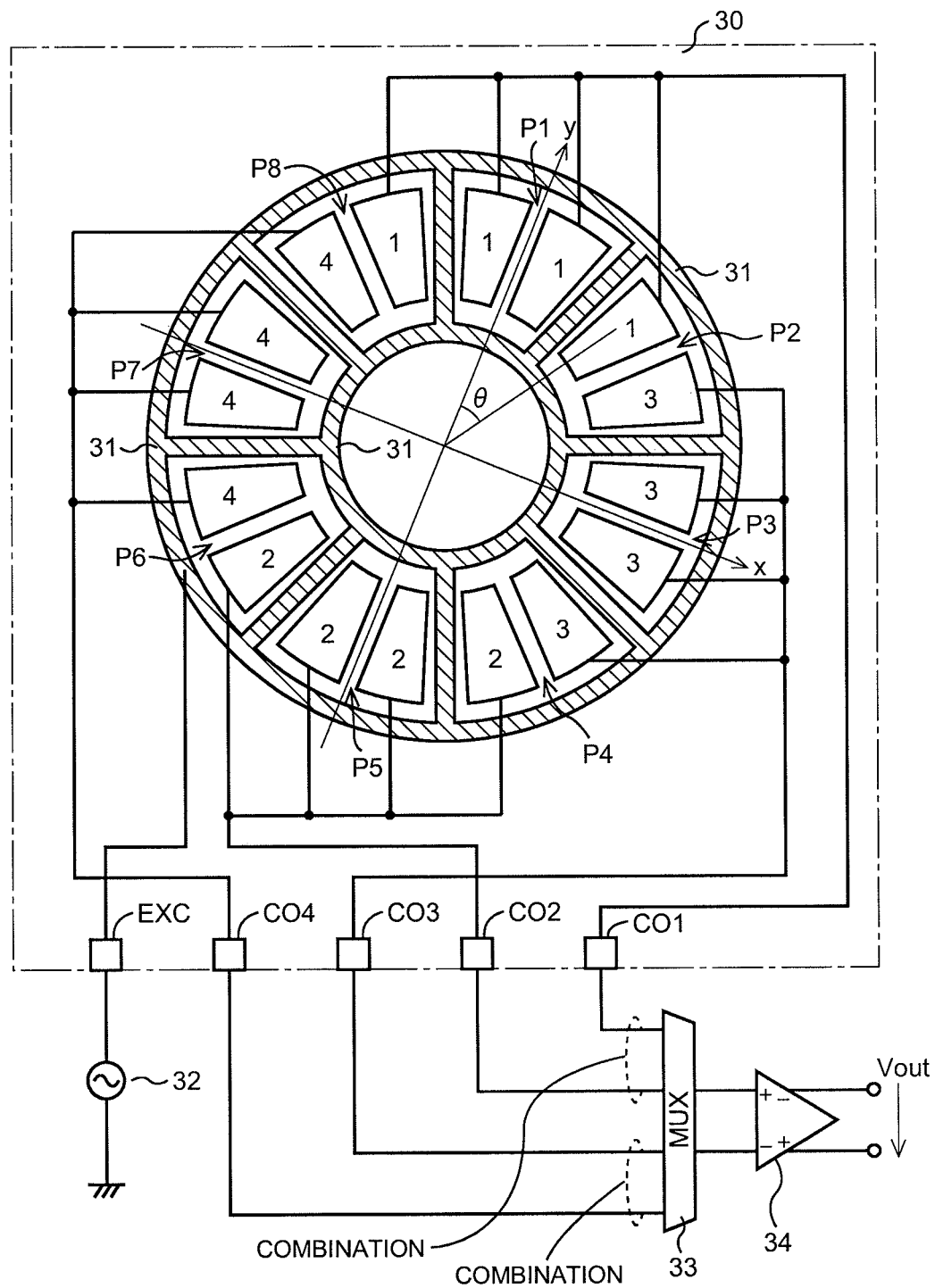
FIG. 5 shows an electrostatic capacity type touch sensor and a signal processing circuit according to a second embodiment of this invention.

First, a structure of the touch panel is described referring to FIG. 5. Four kinds of touch pads (electrodes) 1-4, that are a first kind, a second kind, a third kind and a fourth kind of touch pads, are provided on a substrate 30 such as a PCB substrate. Pairs of touch pads made of one or two kinds of touch pads selected out of the first through fourth kinds of touch pads 1-4 are arrayed in a ring form.

A first through eighth pairs of touch pads (1, 1), (1, 3), (3, 3), (3, 2), (2, 2), (2, 4), (4, 4), and (4, 1) are disposed clockwise in an example shown in FIG. 5. The first pair (1, 1) represents a pair composed of the first kind of touch pad 1 and another first kind of touch pad 1, while the second pair (1, 3) represents a pair composed of the first kind of touch pad 1 and the third kind of touch pad 3. Each of the rest of the pairs represents the similar structure. The pairs of touch pads include pairs of touch pads composed of a single kind of touch pads such as (1, 1), (2, 2), (3, 3) and (4, 4).

Each of the pairs of touch pads composed of a single kind of tough pads are depicted as two separate touch pads in the example shown in FIG. 5 so that they have the same shape as the pairs of touch pads composed of two kinds of touch pads. However, the pairs of touch pads composed of a single kind of touch pads may be shaped in a single touch pad. For example, the first pair of touch pads (1, 1) may be composed of a single first kind of touch pad 1.

Each of the first through eighth pairs of touch pads corresponds to each of first through eighth locations P1-P8, respectively. An excitation pad (electrode) 31 is placed between neighboring pairs of touch pads. The excitation pad 31 corresponds to the excitation pad 12 shown in FIG. 1A to FIG. 1C. The touch pads of the same kind, for example, four first kind of touch pads 1, are connected together with a wiring. Each of the same kinds of touch pads is connected to corresponding each of first through fourth output terminals CO1-CO4, respectively. The excitation pad 31 is connected to an excitation terminal EXC through a wiring.

Next, a structure of the signal processing circuit is explained. An alternating current power supply 32 is connected to the excitation terminal EXC and the excitation pad 31 is provided with an alternating voltage. Each of the first through fourth output terminals CO1-CO4 is connected to corresponding each of four input terminals of a selection circuit 33. The selection circuit 33 selects either a signal from a combination of the first and second kinds of touch pads 1 and 2 outputted through the first and second output terminals CO1 and CO2 or a signal from a combination of the third and fourth kinds of touch pads 3 and 4 outputted through the third and fourth output terminals CO3 and CO4.

An electric charge amplifier 34 is provided in a stage subsequent to the selection circuit 33. The electric charge amplifier 34 is identical to the electric charge amplifier 17. That is, the electric charge amplifier 34 generates a voltage corresponding to a difference between a capacitance of a first capacitor formed between the excitation pad 31 and a touch pad of one kind out of the combination selected by the selection circuit 33 and a capacitance of a second capacitor formed between the excitation pad 31 and a touch pad of another kind out of the combination selected by the selection circuit 33.

That is, when the combination of the first and second kinds of touch pads 1 and 2 is selected, the electric charge amplifier 34 generates a first output voltage V1 corresponding to a difference between a capacitance of a first capacitor formed between the excitation pad 31 and the first kind of touch pad 1 and a capacitance of a second capacitor formed between the excitation pad 31 and the second kind of touch pad 2. The capacitance of the first capacitor and the capacitance of the second capacitor are set to be equal to each other in the initial state in which the finger of the operator is far away from any of the touch pads.

Similarly, when the combination of the third and fourth kinds of touch pads 3 and 4 is selected, the electric charge amplifier 34 generates a second output voltage V2 corresponding to a difference between a capacitance of a third capacitor formed between the excitation pad 31 and the third kind of touch pad 3 and a capacitance of a fourth capacitor formed between the excitation pad 31 and the fourth kind of touch pad 4. The capacitance of the third capacitor and the capacitance of the fourth capacitor are set to be equal to each other in the initial state in which the finger of the operator is far away from any of the touch pads.

Operations of the touch sensor described above are explained referring to Table 1.

TABLE 1

| Location | Pair of Touch Pads | Output of Electric Charge Amplifier (in Phase 1) | Output of Electric Charge Amplifier (in Phase 2) |
| --- | --- | --- | --- |
| P1 | 11 | + | 0 |
| P2 | 13 | + | + |
| P3 | 33 | 0 | + |
| P4 | 32 | − | + |
| P5 | 22 | − | 0 |
| P6 | 24 | − | − |
| P7 | 44 | 0 | − |
| P8 | 41 | + | − |

The selection circuit 33 is controlled by a control circuit so that it selects the combination of the first and second kinds of touch pads 1 and 2 in a first phase (phase 1) and selects the combination of the third and fourth kinds of touch pads 3 and 4 in a subsequent phase (phase 2). When the finger of the operator touches the first location P1, that is a center of the first pair of touch pads (1, 1), the combination of the first and second kinds of touch pads 1 and 2 is selected in the phase 1. According to the principle described above, the electric charge amplifier 34 outputs a positive (+) voltage because the capacitance of the capacitor formed between the excitation pad 31 and the first kind of touch pad 1 is increased.

In the phase 2, on the other hand, the combination of the third and fourth kinds of touch pads 3 and 4 is selected. In this case, the electric charge amplifier 34 outputs 0 V. This is because the finger of the operator touches the first pair of touch pads (1, 1) and there is no difference between the capacitance of the capacitor formed between the excitation pad 31 and the third kind of touch pad 3 and the capacitance of the capacitor formed between the excitation pad 31 and the fourth kind of touch pad 4. Therefore, the output of the electric charge amplifier 34 in the phase 1 and in the phase 2 is represented as (+, 0).

Next, when the finger of the operator touches the second location P2, that is a center of the second pair of touch pads (1, 3), the capacitance of the capacitor formed between the excitation pad 31 and the first kind of touch pad 1 increases in the phase 1, so that the electric charge amplifier 34 outputs the positive (+) voltage. The electric charge amplifier 34 also outputs the positive (+) voltage in the phase 2 because the capacitance of the capacitor formed between the excitation pad 31 and the third kind of touch pad 3 is increased. Therefore, the output of the electric charge amplifier 34 in the phase 1 and in the phase 2 is represented as (+, +).

Next, when the finger of the operator touches the third location P3, that is a center of the third pair of touch pads (3, 3), the electric charge amplifier 34 outputs 0 V in the phase 1 because there is no difference between corresponding capacitances. The electric charge amplifier 34 also outputs the positive (+) voltage in the phase 2 because the capacitance of the capacitor formed between the excitation pad 31 and the third kind of touch pad 3 is increased. Therefore, the output of the electric charge amplifier 34 in the phase 1 and in the phase 2 is represented as (0, +).

When the finger of the operator touches the fourth location P4, that is a center of the fourth pair of touch pads (3, 2), the capacitance of the capacitor formed between the excitation pad 31 and the second kind of touch pad 2 increases in the phase 1, so that the electric charge amplifier 34 outputs a negative (−) voltage. The electric charge amplifier 34 outputs a positive (+) voltage in the phase 2 because the capacitance of the capacitor formed between the excitation pad 31 and the third kind of touch pad 3 is increased. Therefore, the output of the electric charge amplifier 34 in the phase 1 and in the phase 2 is represented as (−, +).

With similar consideration to those as described above, the output of the electric charge amplifier 34 in the phase 1 and in the phase 2 is (−, 0) when the finger of the operator touches the fifth location P5, that is a center of the fifth pair of touch pads (2, 2). When the finger of the operator touches the sixth location P6, that is a center of the sixth pair of touch pads (2, 4), the output of the electric charge amplifier 34 in the phase 1 and in the phase 2 becomes (−, −). When the finger of the operator touches the seventh location P7, that is a center of the seventh pair of touch pads (4, 4), the output of the electric charge amplifier 34 in the phase 1 and in the phase 2 becomes (0, −). When the finger of the operator touches the eighth location P8, that is a center of the eighth pair of touch pads (4, 1), the output of the electric charge amplifier 34 in the phase 1 and in the phase 2 becomes (+, −).

The eight locations can be detected by the outputs of the electric charge amplifier 34 in the phase 1 and in the phase 2 as described above. In other words, the eight locations can be detected with the four inputs CO1-CO4. As a result, the number of input terminals and the number of wirings can be substantially reduced compared with the conventional touch sensor. Note that pairs of touch pads (1, 2) and (3, 4) are not used because the output of the electric charge amplifier 34 is undefined in these cases and these pairs of touch pads do not function in the differential capacitance detection.

Only three values +, 0 and − are used as the output of the electric charge amplifier 34 in detecting the eight locations as described above. Since the electric charge amplifier 34 outputs the analog voltage corresponding to the capacitance difference ΔC, it is possible to detect more than eight locations when the analog voltage is used.

The detection of more than eight locations will be explained hereinafter in detail. A line connecting the center of the first pair of touch pads (1, 1) and the center of the fifth pair of touch pads (2, 2) is referred to as a y-axis, as shown in FIG. 5. A line connecting the center of the third pair of touch pads (3, 3) and the center of the seventh pair of touch pads (4, 4) is referred to as an x-axis. The x-axis and the y-axis intersect orthogonally. Now an angle formed by the y-axis and a line pointing from an intersection of the x-axis and the y-axis to the touch position of the finger of the operator is denoted by $\theta$. The angle $\theta$ is positive when it represents a clockwise rotation from the y-axis, and is negative when it represents a counterclockwise rotation from the y-axis. The angle $\theta$ defined as described above is referred to as a touch position angle. The electric charge amplifier 34 outputs the first output voltage V1 in the phase 1, and outputs the second output voltage V2 in the phase 2.

Figure 6:
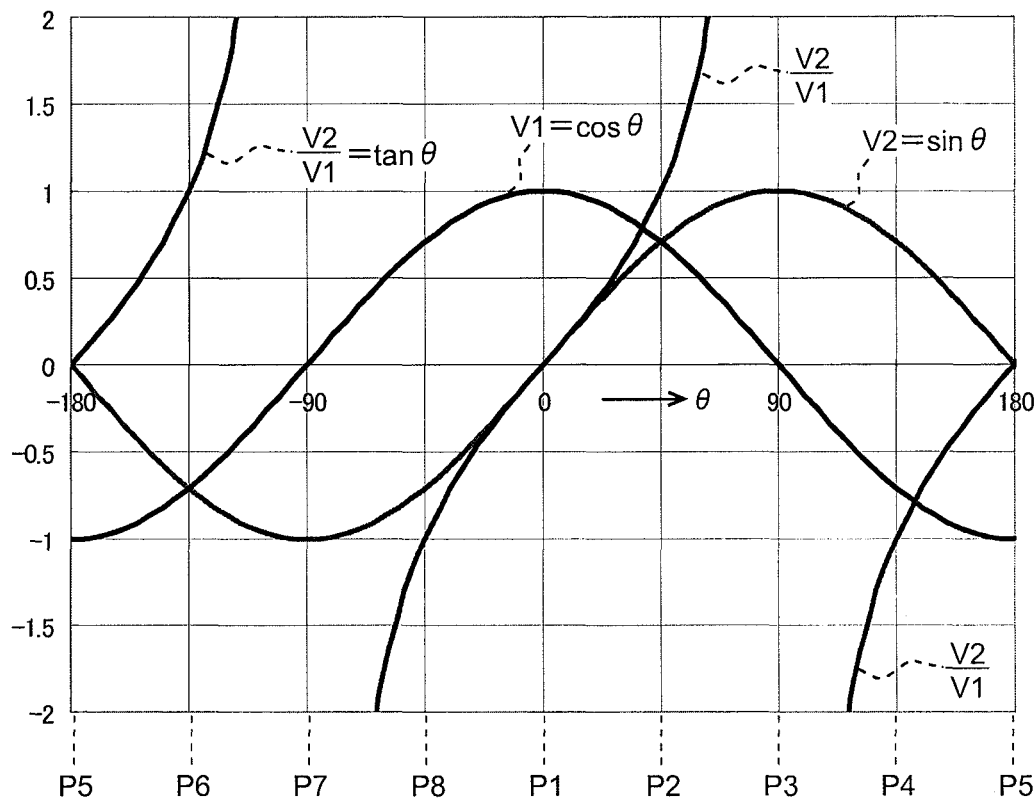
FIG. 6 shows waveforms of outputs of the signal processing circuit for the electrostatic capacitor type touch sensor.
Figure 7:
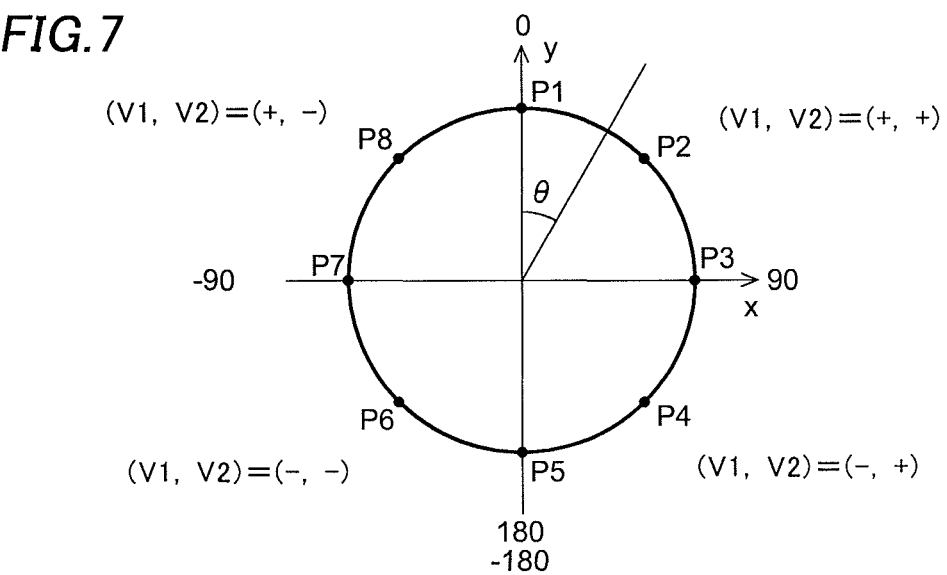
FIG. 7 shows correlation between output voltages of the electric charge amplifier and an angle θ of a touch position.

Then, the first and second output voltages V1 and V2 of the electric charge amplifier 34 vary continuously in accordance with the change in the touch position angle $\theta$, as shown in FIGS. 6 and 7. In this case, the first output voltage V1 is approximated by $\cos \theta$. On the other hand, the second output voltage V2 is approximated by $\sin \theta$. Here, amplitudes of the output voltages V1 and V2 (coefficients of $\cos \theta$ and $\sin \theta$) are normalized to "1".

For example, a case where $\theta=0°$ corresponds to the first location P1 and the output voltages are represented as (V1, V2)=(1, 0). A case where $\theta=45°$ corresponds to the second location P2 and the output voltages are represented as (V1, V2)=(1/√2, 1/√2). A case where $\theta=90°$ corresponds to the third location P3 and the output voltages are represented as (V1, V2)=(0, 1). A case where $\theta=−45°$ corresponds to the eighth location P8 and the output voltages are represented as (V1, V2)=(1/√2, −1/√2).

The touch position angle $\theta$ can be calculated from the output voltages V1 and V2 based on the correlation as described above. In order to calculate the touch position angle $\theta$ more efficiently, it is preferable to use V2/V1 that is a ratio of the output voltage V2 to the output voltage V1. V2/V1 is approximated by $\tan \theta$. That is, V2/V1=$\tan \theta$. Using an inverse function of tan, the touch position angle $\theta$ is represented as $\theta = \arctan(V2/V1)$.

As understood from FIG. 6, it is not possible to determine the touch position angle $\theta$ uniquely by a value of V2/V1. For example, the value of V1/V2=$\tan \theta$ is "1" both at the second location P2 ($\theta=45°$) and at the sixth location P6 ($\theta=−135°$). However, the touch position angle $\theta$ can be uniquely determined when the polarities (+, −) of the first and second output voltages V1 and V2 are taken into consideration. For example, both of the output voltages V1 and V2 are positive (+) in the polarity at the second location P2. On the other hand, both of the output voltages V1 and V2 are negative (−) in the polarity at the sixth location P6 (Refer to FIG. 7).

That is, in which of four quadrants in FIG. 7 the touch position angle $\theta$ is located can be determined from the polarities of the first and second output voltages V1 and V2. When (V1, V2)=(+, +), $0°<\theta<90°$ holds. When (V1, V2)=(−, +), $90°<\theta<180°$ holds. When (V1, V2)=(+, −), $−90°<\theta<0°$ holds. When (V1, V2)=(−, −), $−180°<\theta<−90°$ holds. Therefore, when a range of the touch position angle $\theta$ is determined based on the first and second output voltages V1 and V2, the touch position angle $\theta$ can be uniquely determined from the equation $\theta=\arctan(V2/V1)$.

It is preferable that the algorithm to calculate $\theta$ from the equation $\theta=\arctan(V2/V1)$ and the polarities of V1 and V2 as described above is executed by an computing unit such as a microcomputer after converting the analog values of the output voltages V1 and V2 of the electric charge amplifier 34 into the digital values by an A/D converter. In this case, detection accuracy of the touch position angle $\theta$ depends on resolution of the A/D converter.

Figure 8:
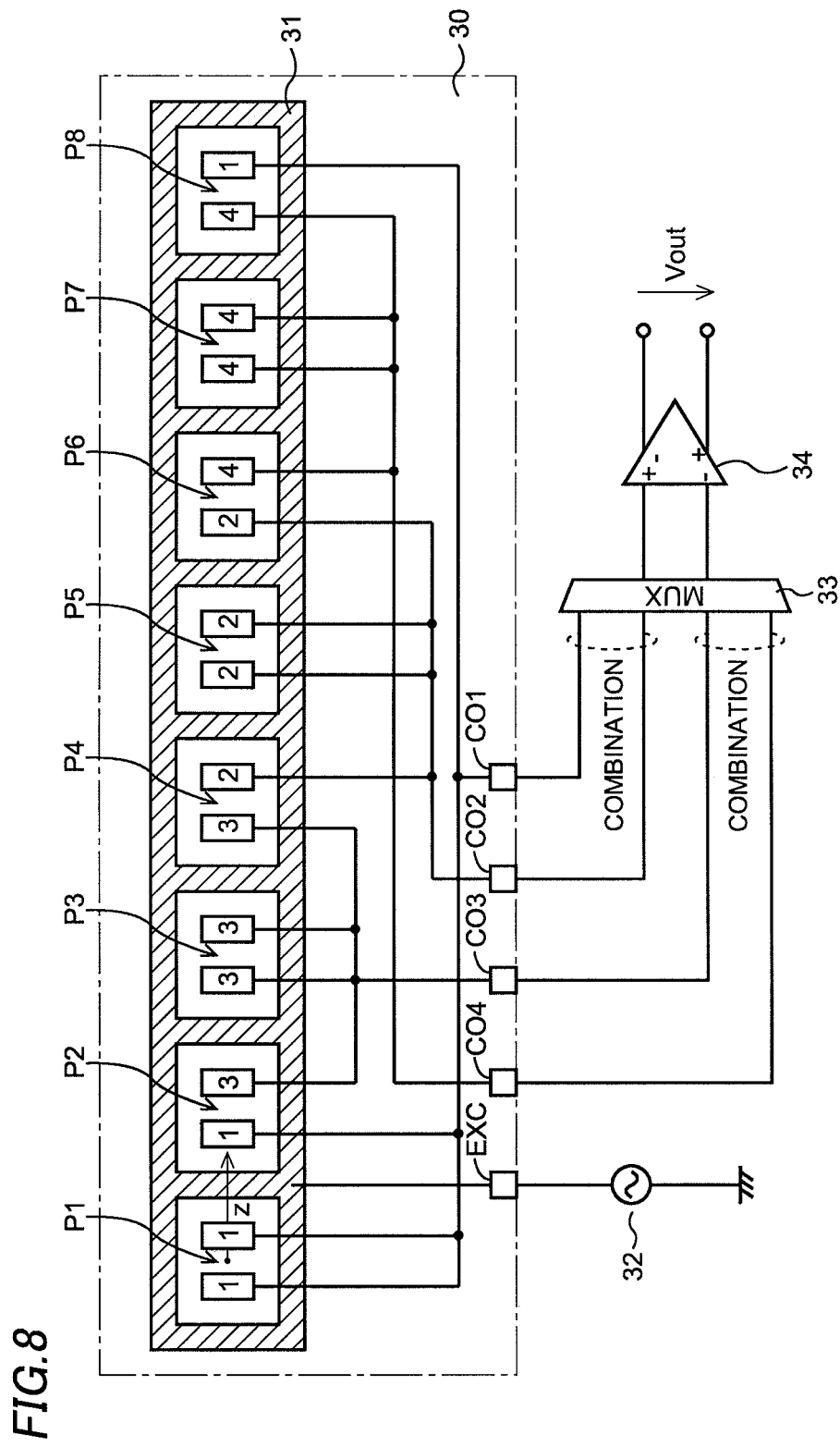
FIG. 8 shows an electrostatic capacity type touch sensor and a signal processing circuit according to a third embodiment of this invention.

While the pairs of touch pads (1, 1), (1, 3), (3, 3), (3, 2), (2, 2), (2, 4), (4, 4), and (4, 1) are arrayed in a ring form in the signal processing circuit according to the second embodiment, identical pairs of touch pads (1, 1), (1, 3), (3, 3), (3, 2), (2, 2), (2, 4), (4, 4), and (4, 1) are arrayed in line in the same order as shown in FIG. 8 in a signal processing circuit according to a third embodiment of this invention. The rest of the structure is the same as in the second embodiment and its operations are also the same as in the second embodiment.

With the signal processing circuit according to the third embodiment, the touch positions can be found also from the first and second output voltages V1 and V2 of the electric charge amplifier 34. That is, taking the first location P1, that is a center of the first pair of touch pads (1, 1) as an origin (z=0), a coordinate of a touch position on a line directing from the origin toward the second location P2 is represented as z. When P1-P8 are equally spaced at intervals of p, for example, the first output voltage V1 is approximated by $\cos(\pi z/4p)$. On the other hand, the second output voltage V2 is approximated by $\sin(\pi z/4p)$. Therefore, the touch position coordinate z can be calculated from $z=4p/\pi \arctan(V2/V1)$ and the polarities of (V1, V2) as in the second embodiment.

An example of a structure of a touch sensor system is described hereafter.

Figure 9:
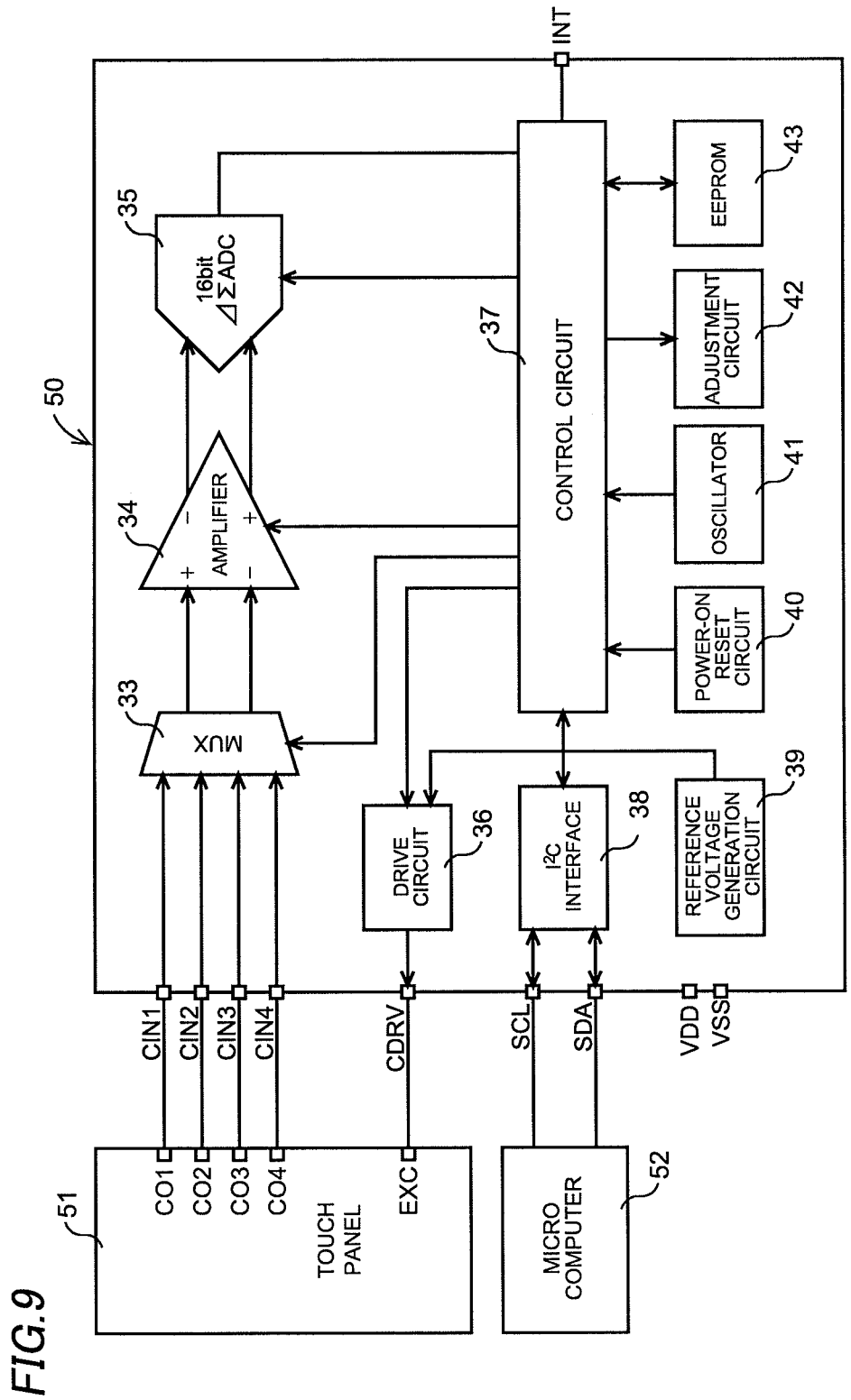
FIG. 9 shows a system structure of the electrostatic capacity type touch sensor and the signal processing circuit.
Figure 10:
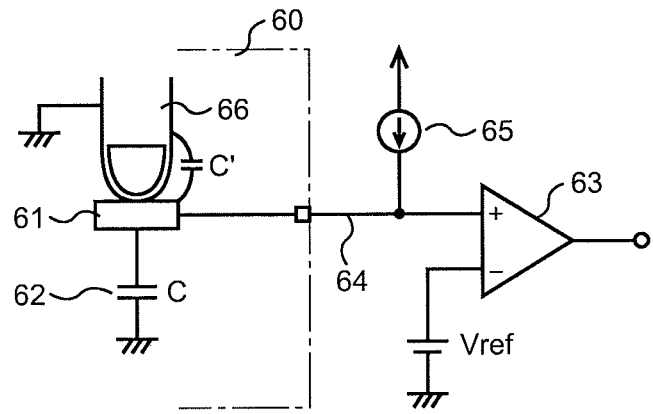
FIG. 10 shows a conventional electrostatic capacity type touch sensor.
Figure 11:
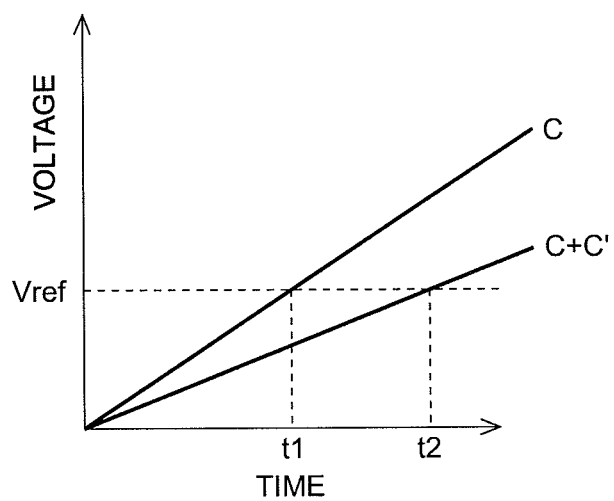
FIG. 11 is to explain operations of the conventional electrostatic capacity type touch sensor.

The touch sensor system is formed to include a signal processing circuit 50, a touch panel 51 and a microcomputer 52, as shown in FIG. 9. The touch panel 51 is identical to the touch panel shown in FIG. 5 or in FIG. 8. The signal processing circuit 50 is structured to include the selection circuit 33, the electric charge amplifier 34, the 16-bit delta sigma A/D converter 35, a drive circuit 36, a control circuit 37, an I²C interface circuit 38, a reference voltage generation circuit 39, a power-on reset circuit 40, an oscillator 41, an offset adjustment circuit 42, an EEPROM 43, first through fourth input terminals CIN1-CIN4, a drive terminal CDRV, a serial clock terminal SCL, a serial data terminal SDA, a power supply terminal VDD, a ground terminal VSS and an interrupt terminal INT.

Each of the signals from the first through fourth output terminals CO1-CO4 in the touch panel 51 is inputted to each of the first through fourth input terminals CIN1-CIN4, respectively. The selection circuit 33 selects between the combination of the first and second input terminals CIN1 and CIN2 and the combination of the third and fourth input terminals CIN3 and CIN4.

Outputs of the selection circuit 33 are inputted to the electric charge amplifier 34. The electric charge amplifier 34 outputs the first and second output voltages V1 and V2. The delta sigma A/D converter 35 converts the first and second output voltages V1 and V2 into digital values. The control circuit 37 controls whole signal processing circuit 50. Output data of the delta sigma A/D converter 35 is converted into serial data in a predetermined format by the control circuit 37 and the I²C interface circuit 38, and transmitted to the microcomputer 52 through the serial clock terminal SCL and the serial data terminal SDA.

In this case, the output of the delta sigma A/D converter 35 is serially transmitted to the microcomputer 52 in synchronization with the serial clock. A program corresponding to the algorithm to calculate the touch position angle θ or the touch position coordinate z on the touch panel 51 as explained in the second or third embodiment is stored in a ROM (Read Only Memory) in the microcomputer 52. The microcomputer 52 calculates the touch position angle θ or the touch position coordinate z on the touch panel 51 by executing the program.

The drive circuit 36 is structured to include the alternating current power supply 32, and provides the excitation terminal EXC in the touch panel 51 with the alternating voltage through the drive terminal CDRV. The reference voltage generation circuit 39 generates the reference voltage Vref that is used in the drive circuit 36.

The power-on reset circuit 40 resets the system when the power supply is turned on. The oscillator 41 generates a system clock. The offset adjustment circuit 42 compensates the offset in the output voltages V1 and V2 of the electric charge amplifier 34 as described above. That is, the offset adjustment circuit 42 determines the adjustment signals based on the output voltages V1 and V2 of the electric charge amplifier 34 so that the offset becomes the desired value that is preferably the minimum value. In this case, the offset adjustment circuit 42 may determines the adjustment signals based on the output voltages V1 and V2 of the electric charge amplifier 34 converted into the digital values by the delta sigma A/D converter 35 so that the offset becomes the desired value that is preferably the minimum value.

The adjustment signals determined by the offset adjustment circuit 42 are written into the EEPROM 43 by the control circuit 37 and stored there. The determined adjustment signals are not erased even when the power supply of the system is turned off, since the EEPROM 43 is a non-volatile memory.

When the power supply of the system is turned on again, the control circuit 37 reads the adjustment signals out of the EEPROM 43 and sets them in the offset adjustment circuit 42. In this case, the offset adjustment circuit 42 has a register that stores the adjustment signals temporarily. With this, once the offset in the output voltage Vout of the electric charge amplifier 34 is adjusted, the offset in the output voltage Vout of the electric charge amplifier 34 is automatically adjusted every time the power supply of the system is turned on.

The noise immunity can be improved with the signal processing circuit for the electrostatic capacity type touch sensor according to the embodiments of this invention, since the differential capacitance detection is adopted. In addition, the accuracy in the detection of the touch position can be improved by adjusting the offset in the output voltage of the electric charge amplifier.

What is claimed is:

1. A signal processing circuit for an electrostatic capacity touch sensor wherein the signal processing circuit receives a signal from a first touch pad and a second touch pad disposed on a touch panel having an excitation pad disposed between the first touch pad and the second touch pad, the touch panel including a substrate, the touch panel also including the first touch pad disposed on the substrate, the second touch pad disposed on the substrate, and the excitation pad disposed on the substrate, the excitation pad being disposed between the first touch pad and the second touch pad;

the signal processing circuit comprising:

a first alternating current power supply configured to generate a first alternating voltage, and apply the first alternating voltage to the excitation pad;

an electric charge amplifier configured to generate an output voltage corresponding to a difference between a first capacitance of a first capacitor and a second capacitance of a second capacitor when the first alternating voltage is applied to the excitation pad, the first capacitor being formed between the first touch pad and the excitation pad, and the second capacitor being formed between the second touch pad and the excitation pad, the electronic charge amplifier having a first input configured for connecting to the first capacitor and a second input configured for connecting to the second capacitor, the electronic charge amplifier also including a first output and a second output;

a first feedback capacitor connected between the first output of the electronic charge amplifier and the first input of the electronic charge amplifier;

a first feedback switch connected between the first output of the electronic charge amplifier and the first input of the electronic charge amplifier, and connected in parallel to the first feedback capacitor;

a second feedback capacitor connected between the second output of the electronic charge amplifier and the second input of the electronic charge amplifier;

a second feedback switch connected between the second output of the electronic charge amplifier and the second input of the electronic charge amplifier, and connected in parallel to the second feedback capacitor;

a third capacitor connected in series with the first capacitor, the third capacitor having a first variable capacitance, the third capacitor configured for connecting to the first input of the electronic charge amplifier;

a fourth capacitor connected in series with the second capacitor, the fourth capacitor having a second variable capacitance, the fourth capacitor configured for connecting to the second input of the electronic charge amplifier;

a second alternating current power supply configured to generate a second alternating voltage that is opposite in phase to the first alternating voltage and to apply the second alternating voltage to the third capacitor and the fourth capacitor, the second alternating current power supply coupled to the first capacitor through the third capacitor and coupled to the second capacitor through the fourth capacitor, the third capacitor and the fourth capacitor configured for connecting between the second alternating current power supply and respective first and second inputs of the electronic charge amplifier; and an offset adjustment circuit configured to adjust the first variable capacitance and the second variable capacitance to adjust an offset in the output voltage of the electric charge amplifier so that a difference between the first variable capacitance and the second variable capacitance is equal to the difference between the first capacitance of the first capacitor and the second capacitance of the second capacitor.

2. The signal processing circuit of claim 1, wherein the offset adjustment circuit adjusts the first variable capacitance of the third capacitor or the second variable capacitance of the fourth capacitor in response to the output voltage of the electric charge amplifier when the second alternating voltage is applied to the third capacitor or the fourth capacitor.

3. The signal processing circuit of claim 2, wherein the third capacitor comprises:
a plurality of first adjustment capacitors, and
a first switching circuit configured to connect one of the plurality of first adjustment capacitors selected by a first adjustment signal from the offset adjustment circuit so that the selected one of the plurality of first adjustment capacitors connects the first capacitor and the second alternating current power supply, and
the fourth capacitor comprises:
a plurality of second adjustment capacitors, and
a second switching circuit configured to connect one of the plurality of second adjustment capacitors selected by a second adjustment signal from the offset adjustment circuit so that the selected one of the plurality of second adjustment capacitors connects the second capacitor and the second alternating current power supply.

4. The signal processing circuit of claim 3, further comprising an electrically writable/erasable non-volatile memory, and a control circuit configured to write the first adjustment signal and the second adjustment signal from the offset adjustment circuit into the non-volatile memory.

5. The signal processing circuit of claim 4, wherein the control circuit is configured to read the first adjustment signal and the second adjustment signal out of the non-volatile memory and set the first adjustment signal and the second adjustment signal into the offset adjustment circuit.

6. The signal processing circuit of claim 1, wherein the second alternating current power supply includes a first terminal coupled to a first terminal of the third capacitor and to a first terminal of the fourth capacitor.

7. The signal processing circuit of claim 1, wherein the first alternating current power supply is connected to a first terminal of the first capacitor and to a first terminal of the second capacitor;
a second terminal of the first capacitor is connected to a first terminal of the third capacitor, and a second terminal of the third capacitor is connected to the second alternating current power supply; and
a second terminal of the second capacitor is connected to a first terminal of the fourth capacitor, and a second terminal of the fourth capacitor is connected to the second alternating current power supply.

8. The signal processing circuit of claim 1, wherein the second alternating current power supply has a first terminal connected to a ground reference voltage and a second terminal connected to both the third capacitor and the fourth capacitor.

9. The signal processing circuit of claim 1 wherein the signal processing circuit is configured to close the first feedback switch and the second feedback switch in a first mode.

10. The signal processing circuit of claim 9 wherein the signal processing circuit is configured to open the first feedback switch and the second feedback switch in a second mode different from the first mode.

11. The signal processing circuit of claim 10 wherein the signal processing circuit is configured to alternate between the first mode and the second mode a multitude of times.

12. The signal processing circuit of claim 1 wherein the first feedback capacitor includes a first terminal and a second terminal, the first terminal connected to the first output of the electric charge amplifier and the second terminal connected to the first input of the electric charge amplifier.

13. The signal processing circuit of claim 12 wherein the second feedback capacitor includes a third terminal and a fourth terminal, the third terminal connected to the second output of the electric charge amplifier and the fourth terminal connected to the second input of the electric charge amplifier.

14. The signal processing circuit of claim 13 wherein the first feedback switch includes a fifth terminal and a sixth terminal, the fifth terminal connected to the first output of the electric charge amplifier and the sixth terminal connected to the first input of the electric charge amplifier.

15. The signal processing circuit of claim 14 wherein the second feedback switch includes a seventh terminal and an eighth terminal, the seventh terminal connected to the second output of the electric charge amplifier and the eighth terminal connected to the second input of the electric charge amplifier.

* * * * *